(12) United States Patent
Bhushan et al.

(10) Patent No.: US 8,472,424 B2
(45) Date of Patent: Jun. 25, 2013

(54) METHOD AND APPARATUS FOR SUPPORTING MULTIPLE MULTIPLEXING SCHEMES FOR WIRELESS COMMUNICATION

(75) Inventors: Naga Bhushan, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 11/676,952

(22) Filed: Feb. 20, 2007

(65) Prior Publication Data

US 2007/0195899 A1 Aug. 23, 2007

Related U.S. Application Data

(60) Provisional application No. 60/775,443, filed on Feb. 21, 2006, provisional application No. 60/775,693, filed on Feb. 21, 2006.

(51) Int. Cl.
*H04J 1/00* (2006.01)

(52) U.S. Cl.
USPC ........... 370/343; 370/310; 370/342; 455/403; 455/450; 455/451

(58) Field of Classification Search
USPC ................. 370/310, 343, 342; 455/403, 450, 455/451
See application file for complete search history.

(56) References Cited

U.S. PATENT DOCUMENTS

| | | | |
|---|---|---|---|
| 6,078,572 A | 6/2000 | Tanno et al. | |
| 6,130,886 A | 10/2000 | Ketseoglou et al. | |
| 6,694,469 B1 | 2/2004 | Jalali et al. | |
| 6,717,924 B2 | 4/2004 | Ho et al. | |
| 6,788,687 B2 | 9/2004 | Bao et al. | |
| 6,822,952 B2 | 11/2004 | Abrol et al. | |

(Continued)

FOREIGN PATENT DOCUMENTS

| | | |
|---|---|---|
| EP | 0959634 A2 | 11/1999 |
| EP | 0995275 | 4/2000 |

(Continued)

OTHER PUBLICATIONS

Rohling et al, Performance Comparison of Different Multiple Access Schemes for the Downlink of an OFDM Communications System, 1997, IEEE.*

(Continued)

*Primary Examiner* — Hassan Phillips
*Assistant Examiner* — Gautam Sharma
(74) *Attorney, Agent, or Firm* — Stanton Braden

(57) ABSTRACT

Techniques for efficiently sending data in a wireless communication system are described. Time frequency resources available for orthogonal frequency division multiplexing (OFDM), which exclude time frequency resources used for traffic data and signaling sent with code division multiplexing (CDM), may be determined. The time frequency resources available for OFDM may be partitioned into multiple tiles. Each tile may be defined based on multiple OFDM symbol numerologies and may have a non-rectangular shape. Each terminal may be assigned at least one tile. A pilot pattern may be selected for each terminal from among multiple pilot patterns, which may support different delay spreads, spatial ranks, etc. Data and pilot may be exchanged with each terminal via the time frequency resources in the at least one tile assigned to the terminal. OFDM symbols may be processed based on multiple OFDM symbol numerologies for each assigned tile.

40 Claims, 13 Drawing Sheets

U.S. PATENT DOCUMENTS

| | | |
|---|---|---|
| 6,882,632 B1 | 4/2005 | Koo et al. |
| 6,912,214 B2 | 6/2005 | Madour et al. |
| 6,963,534 B1 | 11/2005 | Shorey et al. |
| 6,970,437 B2 | 11/2005 | Lott et al. |
| 6,980,569 B1 | 12/2005 | Beyda et al. |
| 6,987,780 B2 | 1/2006 | Wei et al. |
| 7,002,900 B2 | 2/2006 | Walton et al. |
| 7,042,869 B1 | 5/2006 | Bender |
| 7,043,249 B2 | 5/2006 | Sayeedi |
| 7,050,405 B2 | 5/2006 | Attar et al. |
| 7,062,283 B2 | 6/2006 | Dooley |
| 7,065,060 B2 | 6/2006 | Yun et al. |
| 7,088,701 B1 | 8/2006 | Attar et al. |
| 7,099,629 B1 | 8/2006 | Bender |
| 7,127,654 B2 | 10/2006 | Jalali et al. |
| 7,139,274 B2 | 11/2006 | Attar et al. |
| 7,145,940 B2 | 12/2006 | Gore et al. |
| 7,170,876 B2 | 1/2007 | Wei et al. |
| 7,463,867 B2 | 12/2008 | Luo et al. |
| 7,680,211 B1 | 3/2010 | Von der Embse |
| 7,719,991 B2 | 5/2010 | Bhushan et al. |
| 7,764,981 B2 | 7/2010 | Kalofonos et al. |
| 8,077,595 B2 | 12/2011 | Bhushan et al. |
| 2001/0009555 A1 | 7/2001 | Diepstraten et al. |
| 2002/0002704 A1 | 1/2002 | Davis et al. |
| 2002/0145990 A1 | 10/2002 | Sayeedi |
| 2002/0193112 A1 | 12/2002 | Aoki et al. |
| 2003/0040315 A1 | 2/2003 | Khaleghi et al. |
| 2003/0072254 A1 | 4/2003 | Ma et al. |
| 2003/0153327 A1 | 8/2003 | Tajiri et al. |
| 2003/0220103 A1 | 11/2003 | Kim et al. |
| 2003/0235147 A1 | 12/2003 | Walton et al. |
| 2004/0022203 A1 | 2/2004 | Michelson et al. |
| 2004/0063431 A1 | 4/2004 | Julka et al. |
| 2004/0095851 A1 | 5/2004 | Ellner et al. |
| 2004/0141481 A1 | 7/2004 | Lee et al. |
| 2004/0147223 A1 | 7/2004 | Cho |
| 2004/0228267 A1* | 11/2004 | Agrawal et al. ............... 370/203 |
| 2005/0063298 A1 | 3/2005 | Ling et al. |
| 2005/0073969 A1 | 4/2005 | Hart et al. |
| 2005/0111397 A1 | 5/2005 | Attar et al. |
| 2005/0111437 A1 | 5/2005 | Maturi |
| 2005/0111599 A1 | 5/2005 | Walton et al. |
| 2005/0135284 A1 | 6/2005 | Nanda et al. |
| 2005/0135291 A1 | 6/2005 | Ketchum et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0141475 A1 | 6/2005 | Vijayan et al. |
| 2005/0163262 A1 | 7/2005 | Gupta |
| 2005/0195763 A1 | 9/2005 | Kadous et al. |
| 2005/0249177 A1* | 11/2005 | Huo et al. ............... 370/342 |
| 2005/0270969 A1* | 12/2005 | Han et al. ............... 370/210 |
| 2005/0281290 A1 | 12/2005 | Khandekar et al. |
| 2006/0018397 A1 | 1/2006 | Sampath et al. |
| 2006/0018411 A1 | 1/2006 | Gore et al. |
| 2006/0023772 A1* | 2/2006 | Mudulodu et al. ............ 375/144 |
| 2006/0078075 A1 | 4/2006 | Stamoulis et al. |
| 2006/0088003 A1 | 4/2006 | Harris |
| 2006/0133273 A1 | 6/2006 | Julian et al. |
| 2006/0133521 A1 | 6/2006 | Sampath et al. |
| 2006/0135080 A1 | 6/2006 | Khandekar et al. |
| 2006/0136790 A1 | 6/2006 | Julian et al. |
| 2006/0171295 A1* | 8/2006 | Ihm et al. ............... 370/208 |
| 2006/0198344 A1 | 9/2006 | Teague et al. |
| 2006/0203794 A1 | 9/2006 | Sampath et al. |
| 2006/0203845 A1* | 9/2006 | Monogioudis ............... 370/466 |
| 2006/0205413 A1 | 9/2006 | Teague |
| 2006/0209732 A1 | 9/2006 | Gorokhov et al. |
| 2006/0209927 A1 | 9/2006 | Khandekar et al. |
| 2006/0217124 A1 | 9/2006 | Bi et al. |
| 2006/0227887 A1 | 10/2006 | Li et al. |
| 2006/0233124 A1 | 10/2006 | Palanki |
| 2006/0233131 A1 | 10/2006 | Gore et al. |
| 2006/0240784 A1 | 10/2006 | Naguib et al. |
| 2006/0274712 A1 | 12/2006 | Malladi et al. |
| 2006/0276212 A1 | 12/2006 | Sampath et al. |
| 2006/0286974 A1 | 12/2006 | Gore et al. |
| 2007/0010957 A1 | 1/2007 | Sampath et al. |
| 2007/0011589 A1 | 1/2007 | Palanki |
| 2007/0019535 A1 | 1/2007 | Sambhwani et al. |
| 2007/0025325 A1 | 2/2007 | Kumar |
| 2007/0025345 A1 | 2/2007 | Bachl et al. |
| 2007/0030839 A1 | 2/2007 | Vimpari et al. |
| 2007/0070942 A1 | 3/2007 | Harris et al. |
| 2007/0087749 A1* | 4/2007 | Ionescu et al. ............... 455/436 |
| 2007/0195688 A1 | 8/2007 | Bhushan et al. |
| 2007/0195723 A1 | 8/2007 | Attar et al. |
| 2007/0195740 A1 | 8/2007 | Bhushan et al. |
| 2007/0195747 A1 | 8/2007 | Attar et al. |
| 2007/0195908 A1 | 8/2007 | Attar et al. |
| 2007/0293172 A1* | 12/2007 | Shi et al. ............... 455/187.1 |
| 2008/0151743 A1 | 6/2008 | Tong et al. |
| 2009/0067405 A1 | 3/2009 | Zhang et al. |
| 2009/0310702 A1 | 12/2009 | Lewis |
| 2012/0014392 A1 | 1/2012 | Bhushan et al. |

FOREIGN PATENT DOCUMENTS

| | | |
|---|---|---|
| EP | 1367760 A2 | 12/2003 |
| EP | 1422851 A1 | 5/2004 |
| EP | 1489775 | 12/2004 |
| EP | 1513304 A2 | 3/2005 |
| EP | 1542488 A1 | 6/2005 |
| EP | 1565015 A2 | 8/2005 |
| EP | 1596525 A1 | 11/2005 |
| EP | 1608120 | 12/2005 |
| EP | 1619847 | 1/2006 |
| GB | 2394871 A | 5/2004 |
| JP | 2000270024 | 9/2000 |
| JP | 2002320260 A | 10/2002 |
| JP | 2002374562 A | 12/2002 |
| JP | 2002544733 | 12/2002 |
| JP | 2003533078 | 11/2003 |
| JP | 2004158901 A | 6/2004 |
| JP | 2005510904 A | 4/2005 |
| JP | 2005536967 T | 12/2005 |
| JP | 2006270968 A | 10/2006 |
| JP | 2009503912 A | 1/2009 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | WO0176110 A2 | 10/2001 |
| WO | WO0180477 | 10/2001 |
| WO | WO0219605 | 3/2002 |
| WO | WO03017688 A2 | 2/2003 |
| WO | WO03034644 A1 | 4/2003 |
| WO | WO03041298 | 5/2003 |
| WO | WO03096581 A1 | 11/2003 |
| WO | WO03096598 | 11/2003 |
| WO | 2004004269 | 1/2004 |
| WO | WO2004038984 A2 | 5/2004 |
| WO | WO2004038988 | 5/2004 |
| WO | WO2004056142 | 7/2004 |
| WO | WO2004057894 A1 | 7/2004 |
| WO | 2004084450 | 9/2004 |
| WO | 2004095851 | 11/2004 |
| WO | WO 2004095851 A2 * | 11/2004 |
| WO | WO2004098098 | 11/2004 |
| WO | WO2004114548 A1 | 12/2004 |
| WO | WO2004114549 | 12/2004 |
| WO | 2005015775 | 2/2005 |
| WO | WO2005032001 A1 | 4/2005 |
| WO | WO2005048640 | 5/2005 |
| WO | WO2005067247 A1 | 7/2005 |
| WO | WO2005071867 | 8/2005 |
| WO | WO2005088882 A1 | 9/2005 |
| WO | WO2005125139 A1 | 12/2005 |
| WO | 2006086497 A1 | 8/2006 |

OTHER PUBLICATIONS

Ojanpera, et al.: "Frames-hybrid multiple access technology," IEEE ISSSTA. IEEE International Symposium on Spread Spectrum Techniques and Applications, Mainz, Germany, No. 1, pp. 320-324, XP002077020, Sep. 22, 1996.

Rohling, et al.: "Performance Comparison of Different Multiple Access Schemes for the Downlink of an OFDM Communication System," IEEE Vehicular Technology Conference 3, vol. 3, XP010229083, ISBN: 0-7803-3659-3, pp. 1365-1369, May 3-7, 1997.

International Search Report-PCT/US2007/062443, International Searching Authority-European Patent Office—Sep. 24, 2007.

Written Opinion—PCT/US2007/062443, International Searching Authority—European Patent Office—Sep. 24, 2007.

International Preliminary Report on Patentability—PCT/US2007/062443, International Bureau of WIPO-Geneva, Switzerland—Aug. 26, 2008.

Fan, et al.; "On the Reverse Link Performance of Cdma2000 1Xev-Do Revision A System", IEEE Xplore Online, Feb. 2005, pp. 2244-2250,XP002438335,New York, USA.

Taiwan Search Report—TW096106486—TIPO—Jan. 10, 2011.

* cited by examiner

640

Pilot Pattern Format 4

Even Tile

Odd Tile

16x8 Rectangular Tile

650

Pilot Pattern Format 5

Even Tile

Odd Tile

16x8 Rectangular Tile

METHOD AND APPARATUS FOR SUPPORTING MULTIPLE MULTIPLEXING SCHEMES FOR WIRELESS COMMUNICATION

CLAIM OF PRIORITY UNDER 35 U.S.C. §119

The present Application for Patent claims priority to Provisional Application Ser. No. 60/775,443, entitled "Wireless Communication System and Method," and Provisional Application Ser. No. 60/775,693, entitled "DO Communication System and Method," both filed Feb. 21, 2006, assigned to the assignee hereof, and expressly incorporated herein by reference.

BACKGROUND

I. Field

The present disclosure relates generally to communication, and more specifically to transmission techniques for a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A multiple-access system may utilize one or more multiplexing schemes such as code division multiplexing (CDM), time division multiplexing (TDM), etc. The system may be deployed and may serve existing terminals. It may be desirable to improve the performance of the system while retaining backward compatibility for the existing terminals. For example, it may be desirable to employ spatial techniques such as multiple-input multiple-output (MIMO) and spatial division multiple access (SDMA) to improve throughput and/or reliability by exploiting additional spatial dimensionalities provided by use of multiple antennas.

There is therefore a need in the art for transmission techniques that can support advanced communication techniques (e.g., spatial techniques) while retaining backward compatibility for existing terminals.

SUMMARY

Techniques for efficiently sending data in a wireless communication system are described herein. The techniques utilize a slot structure that is backward compatible with existing design. The techniques also employ orthogonal frequency division multiplexing (OFDM) to efficiently support spatial techniques and/or other advanced communication techniques.

According to an aspect, an apparatus is described which determines time frequency resources available for OFDM and excluding time frequency resources used for traffic data and signaling sent with CDM. The apparatus assigns the time frequency resources available for OFDM to at least one terminal and exchanges data with each terminal via the time frequency resources assigned to that terminal.

According to another aspect, an apparatus is described which receives an assignment of time frequency resources selected from time frequency resources available for OFDM and excluding time frequency resources used for traffic data and signaling sent with CDM. The apparatus exchanges data via the time frequency resources in the assignment.

Various aspects and features of the disclosure are described in further detail below.

DETAILED DESCRIPTION

The transmission techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE) (which is part of E-UTRA), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

For clarity, various aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are often used interchangeably. Currently, HRPD Revisions (Revs.) 0, A, and B have been standardized, HRPD Revs. 0 and A are deployed, and HRPD Rev. C is under development. HRPD Revs. 0 and A cover single-carrier HRPD (1xHRPD). HRPD Rev. B covers multi-carrier HRPD and is backward compatible with HRPD Revs. 0 and A. The techniques described herein may be incorporated in any HRPD revision. For clarity, HRPD terminology is used in much of the description below.

Figure 1:
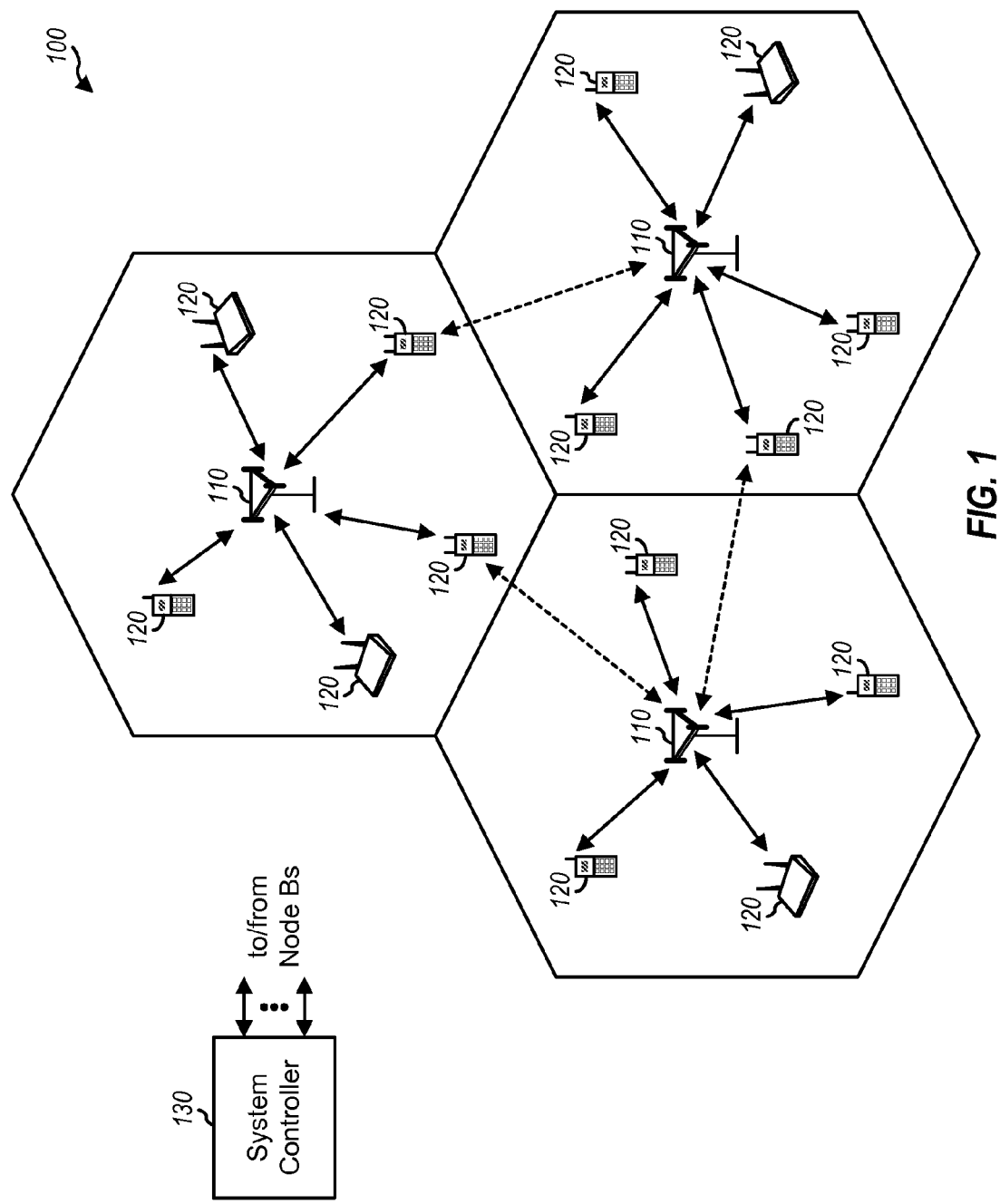
FIG. 1 shows a wireless communication system.

FIG. 1 shows an HRPD communication system 100 with multiple access points 110 and multiple terminals 120. An access point is generally a fixed station that communicates with the terminals and may also be referred to as a base station, a Node B, etc. Each access point 110 provides communication coverage for a particular geographic area and supports communication for the terminals located within the coverage area. Access points 110 may couple to a system controller 130 that provides coordination and control for these access points. System controller 130 may include network entities such as a Base Station Controller (BSC), a Packet Control Function (PCF), a Packet Data Serving Node (PDSN), etc.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a handheld device, a wireless modem, a laptop computer, etc. A terminal may support any HRPD Revision. In HRPD, a terminal may receive a transmission on the forward link from one access point at any given moment and may send a transmission on the reverse link to one or more access points. The forward link (or downlink) refers to the communication link from the access points to the terminals, and the reverse link (or uplink) refers to the communication link from the terminals to the access points.

Figure 2:
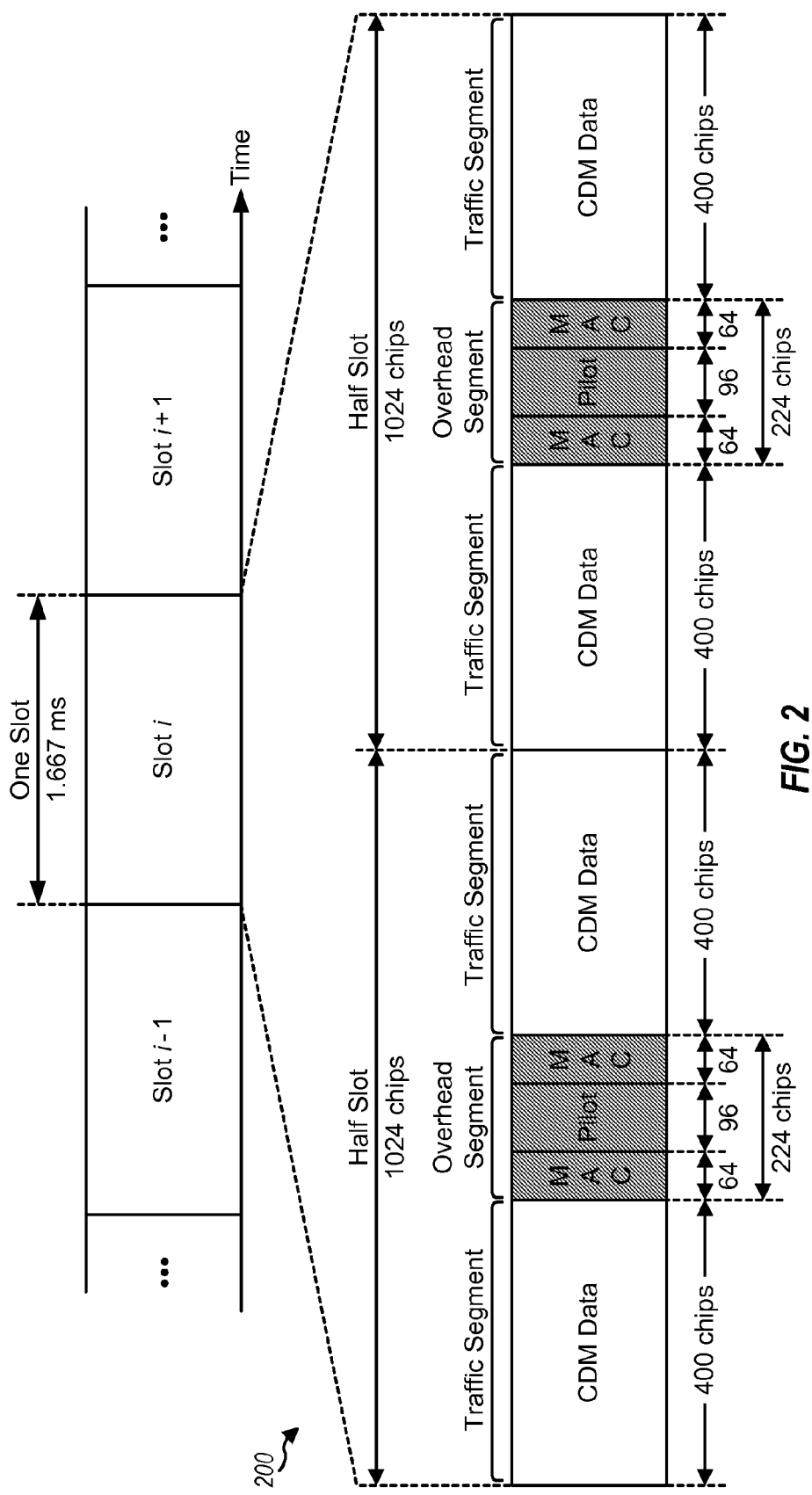
FIG. 2 shows a slot structure in High Rate Packet Data (HRPD).

FIG. 2 shows a slot structure 200 that supports CDM on the forward link in HRPD. The transmission timeline is partitioned into slots. Each slot has a duration of 1.667 milliseconds (ms) and spans 2048 chips. Each chip has a duration of 813.8 nanoseconds (ns) for a chip rate of 1.2288 mega chips/second (Mcps). Each slot is divided into two identical half-slots. Each half-slot includes (i) an overhead segment composed of a pilot segment at the center of the half-slot and two Media Access Control (MAC) segments on both sides of the pilot segment and (ii) two traffic segments on both sides of the overhead segment. The traffic segments may also be referred to as traffic channel segments, data segments, data fields, etc. The pilot segment carries pilot and has a duration of 96 chips. Each MAC segment carries signaling (e.g., reverse power control (RPC) information) and has a duration of 64 chips. Each traffic segment carries traffic data (e.g., unicast data for specific terminals, broadcast data, etc.) and has a duration of 400 chips.

HRPD Revs. 0, A and B use CDM for data sent in the traffic segments. A traffic segment may carry CDM data for one or more terminals being served by an access point. The traffic data for each terminal may be processed based on coding and modulation parameters determined by channel feedback received from that terminal to generate data symbols. The data symbols for the one or more terminals may be demultiplexed and covered with 16-chip Walsh functions or codes to generate the CDM data for the traffic segment. The CDM data is thus generated in the time domain using Walsh functions. A CDM traffic segment is a traffic segment carrying CDM data.

It may be desirable to use OFDM and/or single-carrier frequency division multiplexing (SC-FDM) for data sent in the traffic segments. OFDM and SC-FDM partition the available bandwidth into multiple orthogonal subcarriers, which are also referred to as tones, bins, etc. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support MIMO and SDMA, which may be applied independently on each subcarrier and may thus provide good performance in a frequency selective channel. For clarity, the use of OFDM to send data is described below.

It may be desirable to support OFDM while retaining backward compatibility with HRPD Revs. 0, A and B. In HRPD, the pilot and MAC segments may be demodulated by all active terminals at all times whereas the traffic segments may be demodulated by only the terminals being served. Hence, backward compatibility may be achieved by retaining the pilot and MAC segments and modifying the traffic segments. OFDM data may be sent in an HRPD waveform by replacing the CDM data in a given 400-chip traffic segment with one or more OFDM symbols having a total duration of 400 chips or less.

Figure 3:
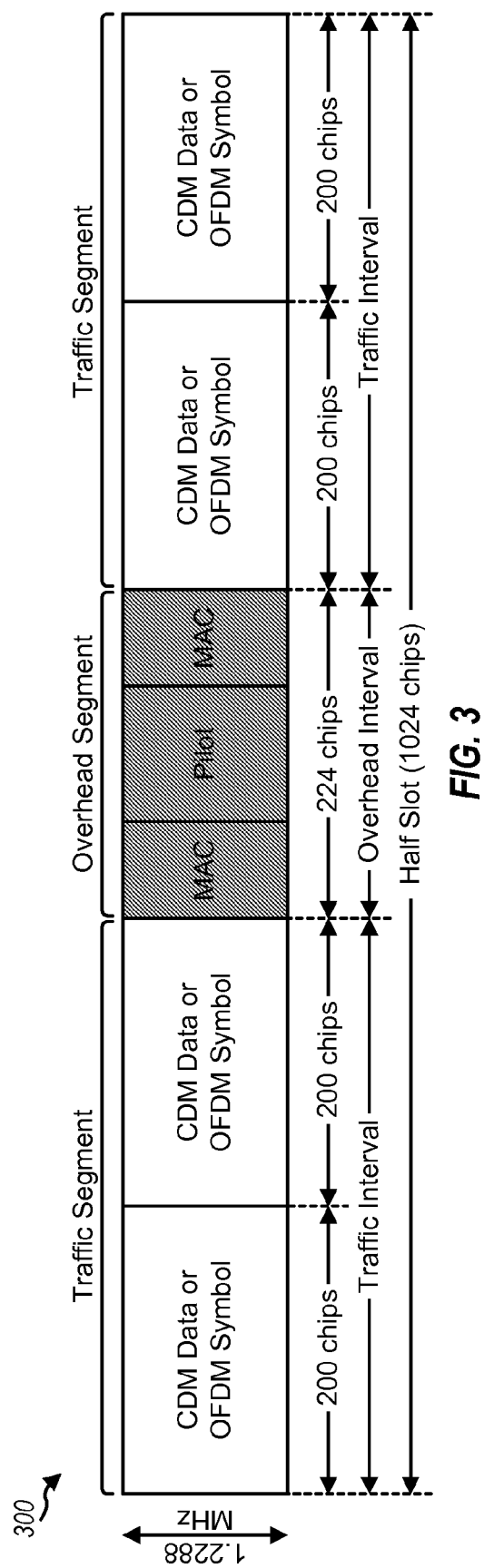
FIG. 3 shows a slot structure that supports OFDM and CDM in HRPD.

FIG. 3 shows a slot structure 300 that supports OFDM and CDM in HRPD. For simplicity, only one half-slot is shown in FIG. 3. The half-slot includes (i) an overhead segment composed of a 96-chip pilot segment and two 64-chip MAC segments and (ii) two traffic segments on both sides of the overhead segment. Each traffic segment is sent in a 400-chip traffic interval, and the overhead segment is sent in a 224-chip overhead interval. In one design, CDM or OFDM may be selected for each traffic segment. In this design, each traffic segment may carry CDM data if CDM is selected or one or more OFDM symbols if OFDM is selected. In other design, a traffic segment may carry both CDM data and OFDM data. For example, a traffic segment may carry CDM data in half of the traffic segment and one or more OFDM symbols in the other half of the traffic segment.

In general, OFDM symbols may be generated based on various OFDM symbol numerologies or designs. Each OFDM symbol numerology is associated with specific values for pertinent parameters such as OFDM symbol duration, number of subcarriers, cyclic prefix length, etc. The OFDM symbol duration should be an integer divisor of the 400-chip traffic segment in order to fully utilize the traffic segment. Furthermore, the sample rate for the OFDM symbols should be an integer multiple of the chip rate for the CDM data in order to simplify processing at the access points and terminals.

Table 1 lists three example "normal" OFDM symbol numerologies 1, 2 and 3 that may be used for a traffic interval in HRPD and two example "long" OFDM symbol numerologies 1 and 2 that may be used for an overhead interval in HRPD. These numerologies are selected to be compatible with HRPD slot structure and chip rate so that (i) an integer number of OFDM symbols is sent in a traffic or overhead segment and (ii) the sample rate for the OFDM symbols is an integer multiple of the chip rate for the CDM data. These numerologies are further selected such that the number of subcarriers, which determines a discrete Fourier transform (DFT) size, allow for efficient generation of the OFDM symbols. For these numerologies, the number of subcarriers is not a power of 2 but has small prime factors. For example, 90 subcarriers may be obtained with prime factors of 2, 3, 3 and 5. The small prime factors may allow for efficient mixed-radix fast Fourier transform (FFT) implementations to generate the OFDM symbols. In Table 1, n is a positive interval value that is dependent on the spectral allocation. The numerologies shown in Table 1 allow for efficient embedding of OFDM data in an HRPD waveform. Any of the normal OFDM symbol numerologies may be used to replace CDM data with OFDM data in a traffic interval. Any of the long OFDM symbol numerologies may be used to send OFDM data in an overhead interval. Other OFDM symbol numerologies may also be used for the traffic and overhead segments.

TABLE 1

| Parameter | Normal OFDM Symbol Numerology 1 | Normal OFDM Symbol Numerology 2 | Normal OFDM Symbol Numerology 3 | Long OFDM Symbol Numerology 1 | Long OFDM Symbol Numerology 2 | Unit |
|---|---|---|---|---|---|---|
| Sample rate | 1.2288 × n | 1.2288 × n | 1.2288 × n | 1.2288 × n | 1.2288 × n | Msps |
| Number of subcarriers | 90 × n | 180 × n | 360 × n | 100 × n | 200 × n | |
| Subcarrier spacing | 13.65333 . . . | 6.82666 . . . | 3.41333 . . . | 12.288 . . . | 6.144 . . . | KHz |
| Useful portion | 90 | 180 | 360 | 100 | 200 | chips |
| Cyclic prefix length | 7.5 | 16 | 36 | 8 | 20 | chips |
| Guard time | 2.5 | 4 | 4 | 4 | 4 | chips |
| OFDM symbol duration | 100 | 200 | 400 | 112 | 224 | chips |

Figure 4:
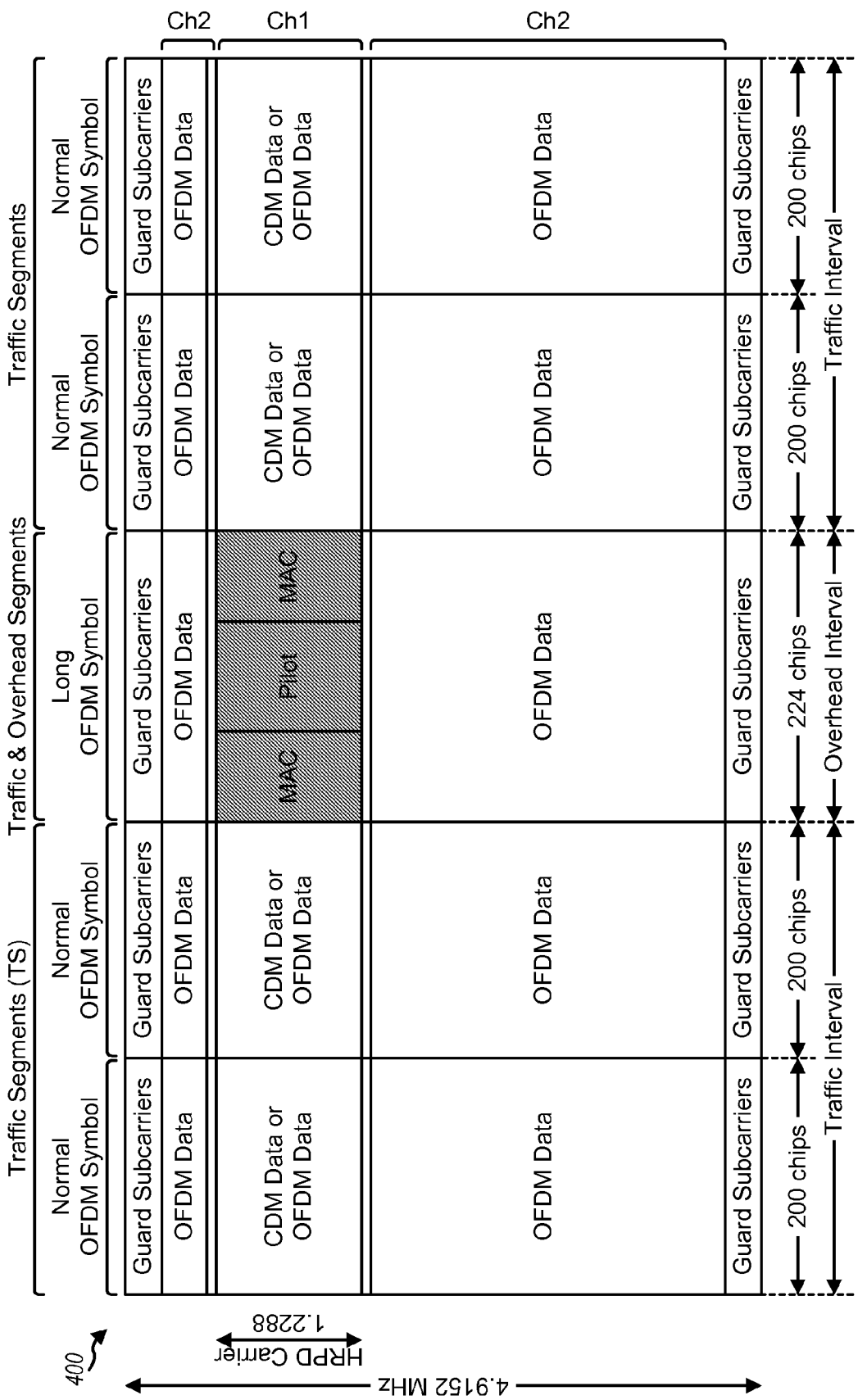
FIG. 4 shows a slot structure that supports OFDM and CDM for a single HRPD carrier in a 5 MHz spectral allocation.

FIG. 4 shows a slot structure 400 that supports OFDM and CDM for a single HRPD carrier in a 5 MHz spectral allocation. In the example shown in FIG. 4, the single HRPD carrier is located near one edge of the 5 MHz spectral allocation. The pilot and MAC segments for the HRPD carrier are sent in the center of the half-slot. The two traffic segments for the HRPD carrier may each carry CDM data and/or OFDM data.

An OFDM spectrum may be defined to include all usable spectrum in the spectral allocation except for any HRPD carriers. In the example shown in FIG. 4, the OFDM spectrum includes the usable spectrum on both sides of the single HRPD carrier. In general, up to three HRPD carriers may be sent in the 5 MHz spectral allocation, and the OFDM spectrum may then exclude all of the HRPD carriers.

A normal OFDM symbol may be generated for each OFDM symbol period in a traffic interval. The normal OFDM symbol period is 200 chips with normal OFDM symbol numerology 2 in Table 1. The normal OFDM symbol may carry OFDM data on (i) subcarriers corresponding to traffic segments used for OFDM and (ii) subcarriers in the OFDM spectrum. The normal OFDM symbol may be nulled out on subcarriers corresponding to traffic segments with CDM data.

A long OFDM symbol may be generated for each OFDM symbol period in an overhead interval. The long OFDM symbol period is 224 chips with long OFDM symbol numerology 2 in Table 1. The long OFDM symbol may carry OFDM data on subcarriers in the OFDM spectrum and may be nulled out on subcarriers corresponding to the overhead segment sent with CDM.

The OFDM spectrum may be used to implement an OFDMA channel that may be operated independently of the traffic and overhead segments in legacy HRPD. In FIG. 4, logical channel Ch1 may include the traffic segments for the HRPD carrier, and logical channel Ch2 may correspond to the OFDMA channel. The OFDMA channel may employ various features commonly used in a pure OFDMA system that utilizes only OFDM for transmission. For example, the time frequency resources available for the OFDMA channel may be partitioned into blocks, which may be assigned to terminals.

Figure 5A:
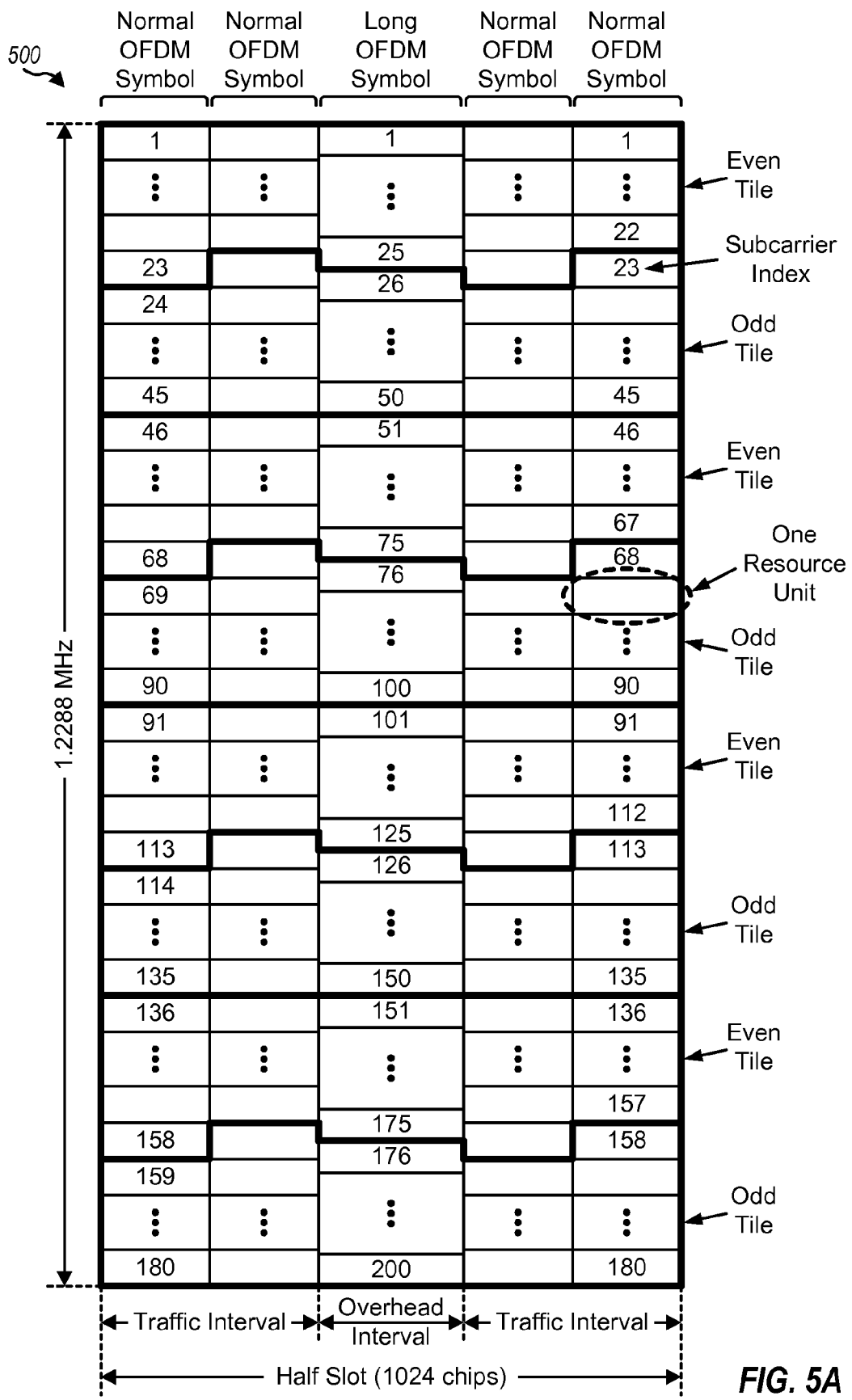
FIGS. 5A and 5B show a tile structure with non-rectangular tiles.

FIG. 5A shows a design of a tile structure 500 that may be used for the HRPD slot structure shown in FIG. 2. Tile structure 500 covers one HRPD carrier in one half-slot and includes the two traffic segments and the overhead segment shown in FIG. 3. Tile structure 500 is also based on normal OFDM symbol numerology 2 and long OFDM symbol numerology 2 in Table 1. For this design, a traffic segment covers two normal OFDM symbols and spans 180 subcarriers with indices of 1 to 180. An overhead segment covers one long OFDM symbol and spans 200 subcarriers with indices of 1 to 200.

The time frequency resources available for one HRPD carrier in one half-slot may be partitioned into multiple tiles. A tile may also be referred to as a time frequency block, a resource block, etc. It may be desirable to have equal size (or approximately equal size) tiles so that data processing is not dependent on which tiles are assigned. In the design shown in FIG. 5A, the available time frequency resources are partitioned into eight tiles—four "even" tiles and four "odd" tiles.

Figure 5B:
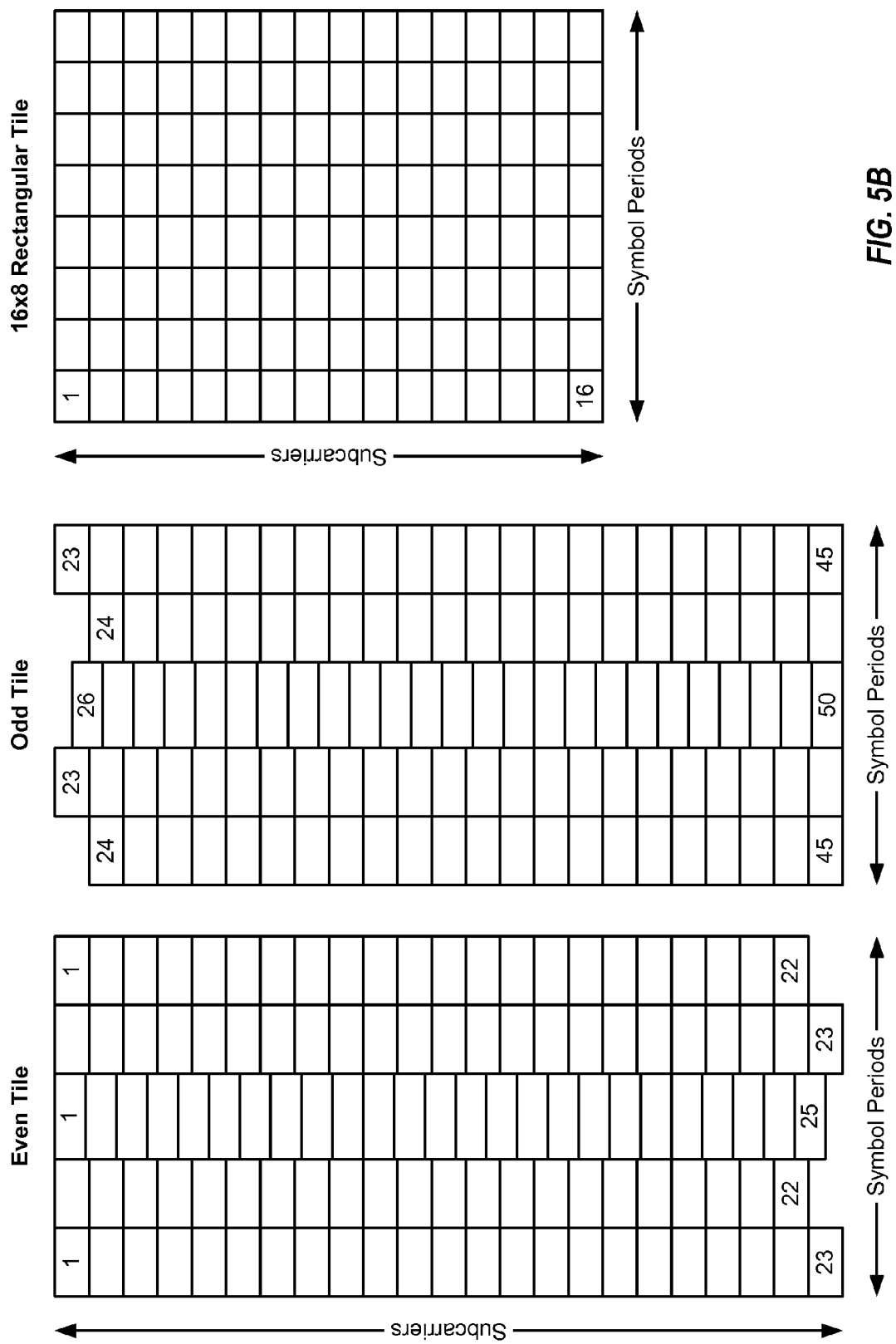

FIG. 5B shows one pair of even and odd tiles in tile structure 500 in FIG. 5A. Each tile spans a half-slot of 833 μs and covers an average of 22.5 contiguous subcarriers per normal OFDM symbol and 25 subcarriers for the long OFDM symbol. Each tile thus includes 90 resource units in the two traffic segments and 25 resource units in the overhead segment. A resource unit is one subcarrier in one OFDM symbol period and is usable to send one modulation symbol. Each tile is pseudo-rectangular, with the even and odd tiles being related by a mirror symmetry. Hence, design features for the even tile may be readily incorporated in the odd tile.

The time frequency resources available for OFDM may also be partitioned in other manners. In another design, the available time frequency resources may be partitioned into six tiles, with each tile covering 30 subcarriers per normal OFDM symbol and either 33 or 34 subcarriers per long OFDM symbol. In yet another design, the available time frequency resources may be partitioned into five tiles, with each tile covering 36 subcarriers per normal OFDM symbol and 40 subcarriers per long OFDM symbol. The time frequency resources available in a slot, or some other time duration instead of a half-slot, may also be partitioned into tiles. In general, a tile may span any time duration and may also cover any number of subcarriers. A tile may include contiguous subcarriers (as shown in FIGS. 5A and 5B) or subcarriers distributed across the OFDM spectrum. A tile may have a non-rectangular shape due to different numbers of subcarriers in different symbol periods, which may result from (i) uneven partitioning of the subcarriers across OFDM symbol periods and/or (ii) use of different OFDM symbol numerologies in different OFDM symbol periods. For clarity, the following description assumes the use of the even and odd tiles shown in FIGS. 5A and 5B.

FIGS. 5A and 5B show tile structure 500 for one HRPD carrier, or n=1 in Table 1. In general, a tile structure may be defined for any number of HRPD carriers or any value of n. For example, tile structure 500 may be scaled by n and may then include 8n tiles in each half-slot.

The available tiles may be assigned to terminals for transmission. In general, a terminal may be assigned zero, one, or multiple tiles in a given scheduling interval (e.g., a half-slot) depending on data requirements of the terminal, the availability of tiles, etc. An access point may send traffic data, signaling, and/or pilot in the assigned tile(s) to the terminal. Pilot is data that is known a priori by both the access point and the terminal and may be used for channel estimation, noise and/or interference estimation, coherent data demodulation or detection, and/or other purposes. Pilot may be sent based on a pilot pattern that indicates specific resource units to use to send pilot symbols. A resource unit used to send a pilot symbol is referred to as a pilot tone in the description below.

An access point may send pilot symbols on pilot tones in a tile. A terminal may estimate channel gains for the pilot tones based on pilot symbols received from the access point. The terminal may derive channel gains for other resource units in the tile based on (e.g., by performing time-frequency interpolation of) the estimated channel gains for the pilot tones. If the number of degrees of freedom of a wireless channel is lower than the number of pilot tones in the tile, then pilot tones not needed to estimate the channel gains may be used to estimate noise and interference power in the tile.

In general, a pilot pattern may include any number of pilot tones, and the pilot tones may be located anywhere within a tile. The number of pilot tones may be selected based on a tradeoff between overhead due to pilot and channel estimation performance. The placement of the pilot tones may be based on various considerations such as delay spread, Doppler spread, support for spatial multiplexing techniques such as MIMO and/or SDMA, etc.

The spacing of the pilot tones in the frequency domain may be selected based on expected delay spread of the wireless channel, where delay spread is reciprocal of coherence bandwidth. Smaller frequency separation between pilot tones may be used to handle larger delay spread. The spacing of pilot tones in the time domain may be selected based on expected Doppler spread of the wireless channel, where Doppler spread is proportional to the speed of a terminal and the carrier frequency. Smaller time separation between pilot tones may be used to handle larger Doppler spread.

The pilot tones may also be placed to support spatial multiplexing techniques such as MIMO and SDMA for the forward and reverse links and quasi-orthogonal multiplexing for the reverse link. With spatial multiplexing, multiple data streams may be sent simultaneously via multiple spatial channels or layers formed by multiple transmit antennas and multiple receive antennas. To support spatial multiplexing, the pilot tones may be arranged in clusters within a tile. The number of pilot tones in each cluster may be equal to or larger than the spatial rank to be supported. Spatial rank refers to the number of spatial channels in a wireless channel, and hence the number of data streams that may be sent in parallel via the wireless channel. The spatial rank may be given as $S \leq \min\{T, R\}$, where T is the number of transmit antennas, R is the number of receive antennas, and S is the spatial rank.

The channel response may be assumed to be static across the pilot tones in each cluster. The pilot tones in each cluster may be used to estimate the channel gains of different data streams/layers or transmit antennas. In a first design, T transmit antennas may be assigned T different pilot tones in a cluster, one pilot tone per transmit antenna, and a pilot symbol may be sent from each transmit antenna on the pilot tone assigned to that antenna. In a second design, code-based multiplexing of pilots may be used for different data streams/layers or transmit antennas. In this design, the pilot for each stream/antenna may be spread across all pilot tones in an entire cluster with an orthogonal code. For example, a pilot symbol for a stream or antenna may be spread across three pilot tones in a cluster (e.g., for pilot pattern format 0 in FIG. 6A below) with a column of a 3×3 DFT matrix. The second design may provide certain advantages such as improved channel estimation accuracy (when the number of streams or antennas is less than the cluster size) and constant signal and interference power spectral density over the first design with one pilot tone per antenna. The second design utilizes the contiguous structure of each pilot cluster to achieve orthogonality in the presence of time and/or frequency channel variations. The pilots for the streams and antennas may also be sent in other manners.

Different pilot patterns may be defined for different channel conditions, e.g., different delay spreads, Doppler spreads, and spatial ranks. The time and frequency separation between different clusters may be selected based on the expected Doppler spread and delay spread, respectively, of the wireless channel. Some example pilot patterns are given below. For each pilot pattern, the placement of the pilot tones is given for the even and odd tiles shown in FIG. 5B (which are non-rectangular tiles) and also given for an equivalent 16×8 rectangular tile covering 16 subcarriers in 8 symbol periods.

Figure 6A:
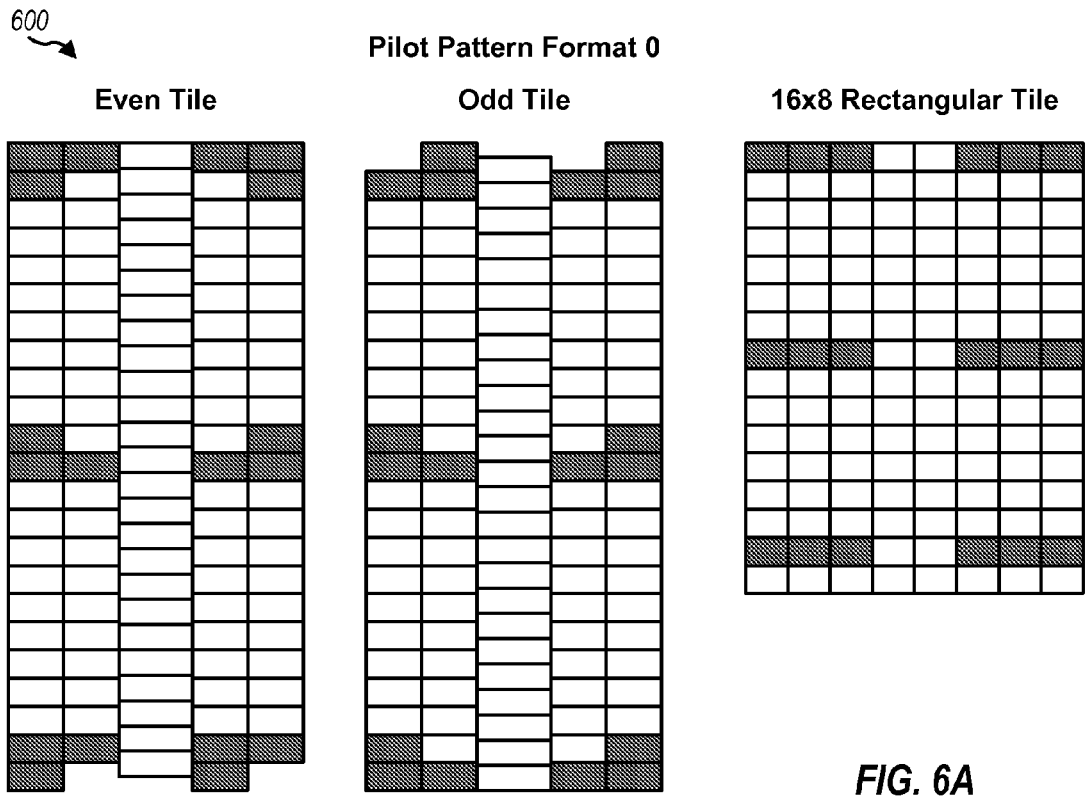
FIGS. 6A through 6G show seven pilot patterns for the tiles in FIGS. 5A and 5B.

FIG. 6A shows a pilot pattern 600 for format 0, which supports moderate delay spread (e.g., up to 2.5 μs for OFDM symbol numerology 2 in Table 1) and spatial rank of up to three. In pilot pattern 600, 18 pilot tones are arranged in six clusters of three. Two clusters are located at the top of a tile, another two clusters are located near the middle of the tile, and the last two clusters are located at the bottom of the tile. The three pilot tones in each cluster may be used to estimate channel gains for up to three spatial channels.

Figure 6B:
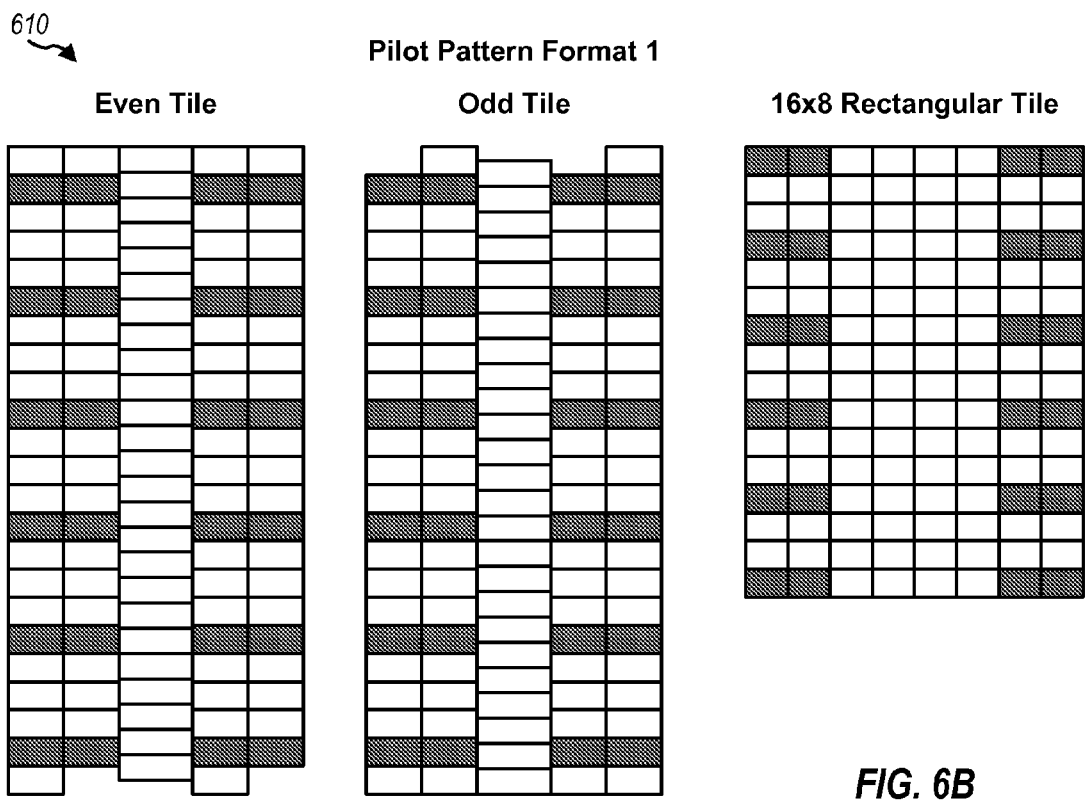

FIG. 6B shows a pilot pattern 610 for format 1, which supports larger delay spread (e.g., up to 6 μs for OFDM symbol numerology 2 in Table 1) and spatial rank of up to two. In pilot pattern 610, 24 pilot tones are arranged in twelve clusters of two. Six pairs of clusters are formed and are distributed across the 22.5 subcarriers in a tile. Each pair includes one cluster in the left half of the tile and another cluster in the right half of the tile. The smaller frequency separation between pilot tones supports larger delay spread. The two pilot tones in each cluster may be used to estimate channel gains for up to two spatial channels.

Figure 6C:
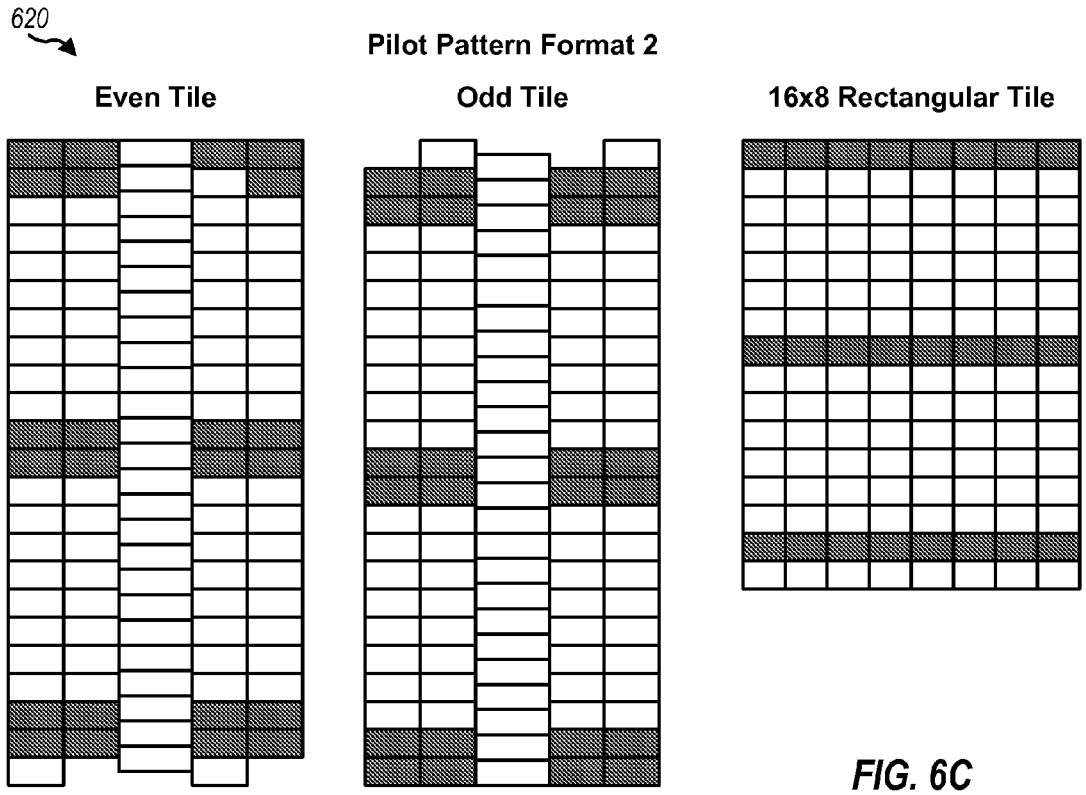

FIG. 6C shows a pilot pattern 620 for format 2, which supports moderate delay spread and spatial rank of up to four. In pilot pattern 620, 24 pilot tones are arranged in six clusters of four. Two clusters are located at the top of a tile, another two clusters are located near the middle of the tile, and the last two clusters are located at the bottom of the tile. The four pilot tones in each cluster may be used to estimate channel gains for up to four spatial channels.

Figure 6D:
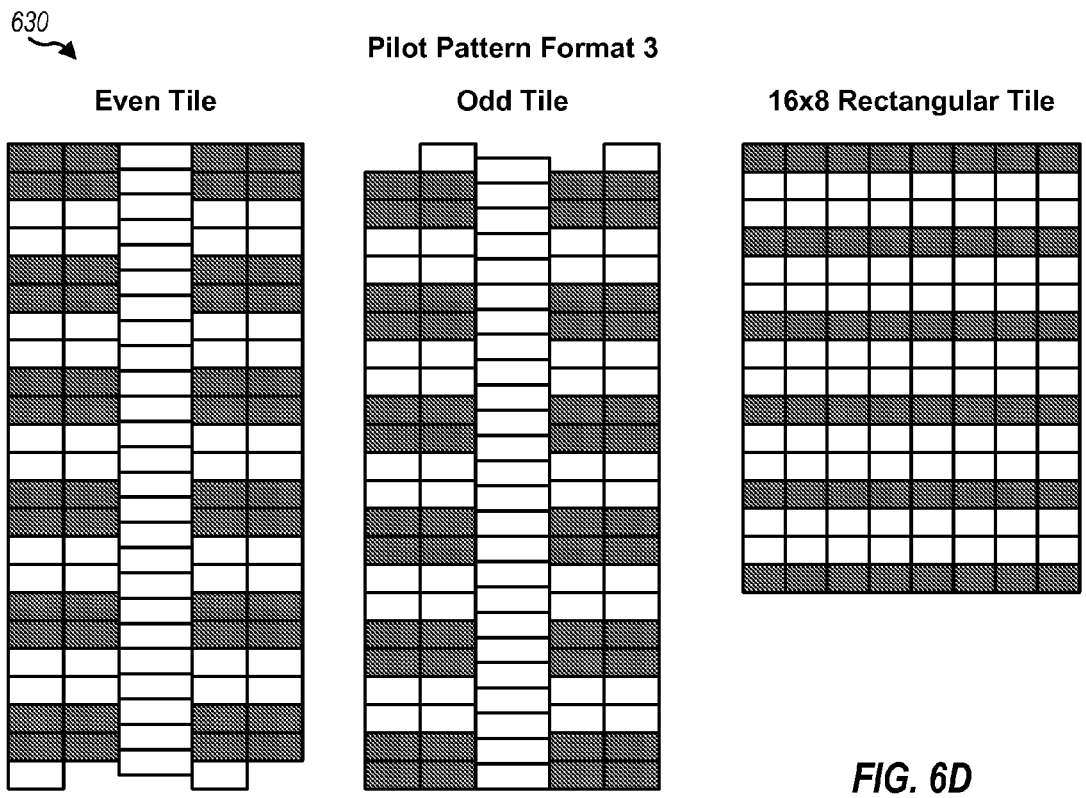

FIG. 6D shows a pilot pattern 630 for format 3, which supports larger delay spread and spatial rank of up to four. In pilot pattern 630, 48 pilot tones are arranged in twelve clusters of four. Six pairs of clusters are formed and are distributed across the 22.5 subcarriers in a tile.

Figure 6E:
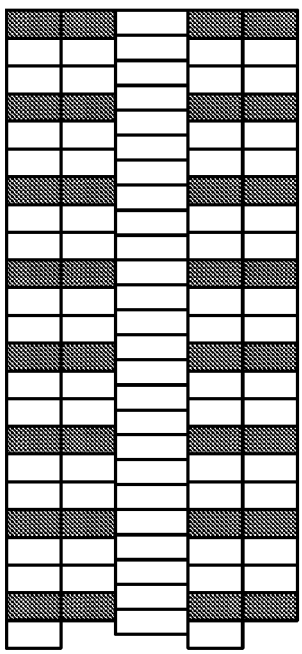
Figure 6E:
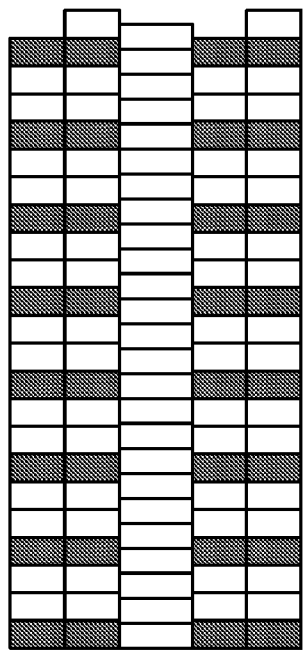
Figure 6E:
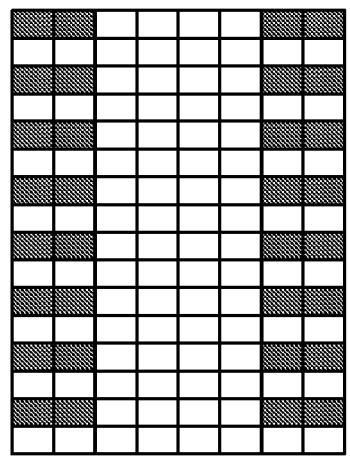

FIG. 6E shows a pilot pattern 640 for format 4, which supports large delay spread (e.g., up to 9 μs for OFDM symbol numerology 2 in Table 1) and spatial rank of up to two. In pilot pattern 640, 32 pilot tones are arranged in 16 clusters of two. Eight pairs of clusters are formed and are distributed across the 22.5 subcarriers in a tile. The small frequency separation between pilot tones supports larger delay spread.

Figure 6F:
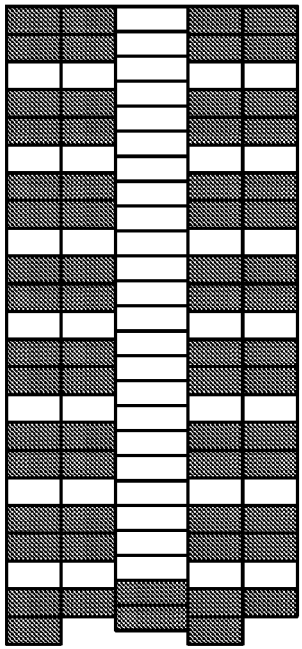
Figure 6F:
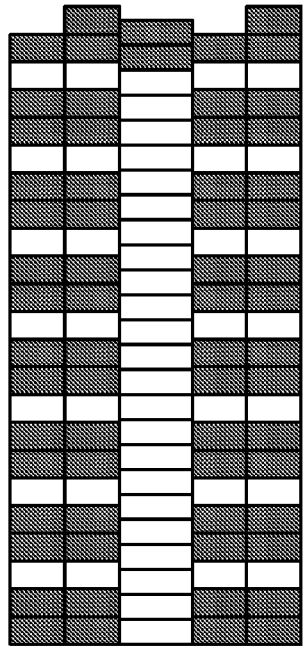
Figure 6F:
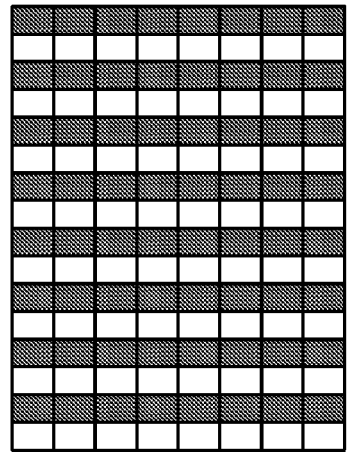

FIG. 6F shows a pilot pattern 650 for format 5, which supports large delay spread and spatial rank of up to four. In pilot pattern 650, 64 pilot tones are arranged in 16 clusters of four. Two clusters, which are at the bottom of the even tile and at the top of the odd tile, include pilot tones in the overhead segment. The clusters are distributed across the 22.5 subcarriers in a tile.

Figure 6G:
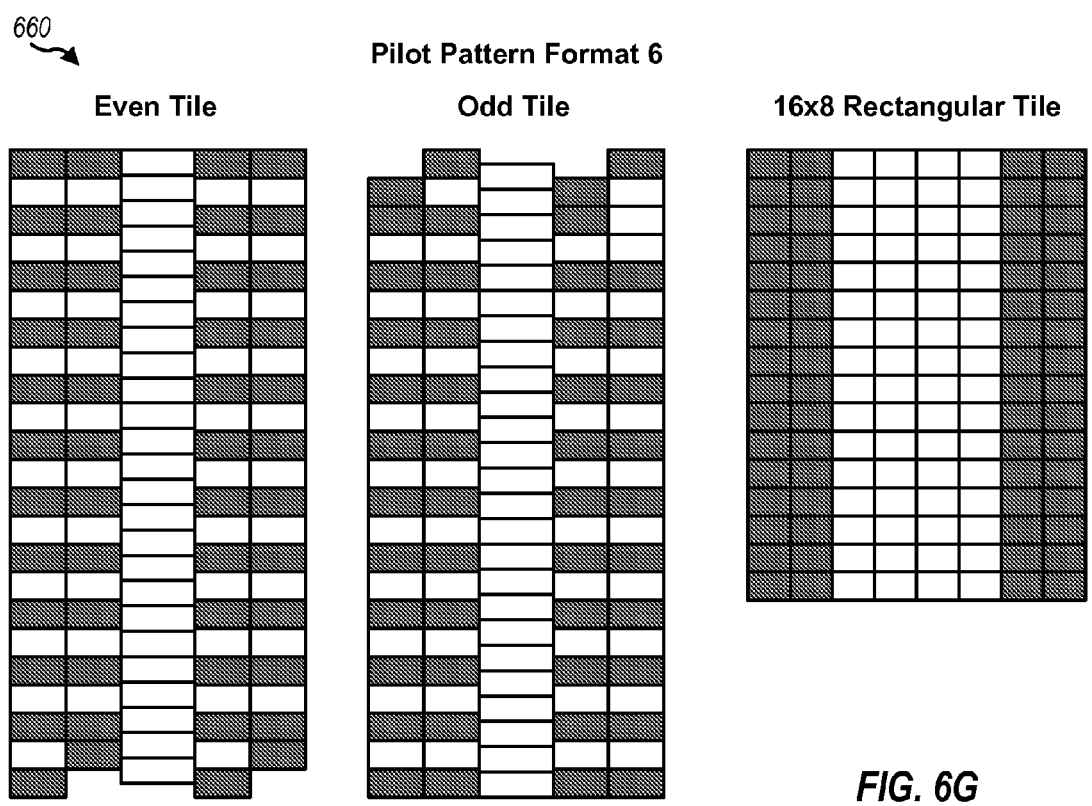

FIG. 6G shows a pilot pattern 660 for format 6, which supports extra large delay spread (e.g., up to 13 μs for OFDM symbol numerology 2 in Table 1) and spatial rank of up to two. In pilot pattern 660, 48 pilot tones are arranged in 24 clusters of two. Two clusters, which are at the bottom of the even tile and at the top of the odd tile, include pilot tones that are adjacent diagonally.

Table 2 summarizes the seven pilot patterns shown in FIGS. 6A through 6G and provides the supported delay spread, the supported spatial rank, and the pilot overhead for the non-rectangular tiles and rectangular tile. Table 2 shows that the overhead for different pilot patterns in the non-rectangular and rectangular tiles are comparable. The pilot patterns for the rectangular tile may also be extended to the non-rectangular tiles in similar manner for other OFDM symbol numerologies, e.g., normal OFDM symbol numerologies 1 and 3 in Table 1.

TABLE 2

| Pilot Pattern | Delay Spread | Spatial Rank | Overhead Non-rectangular Tile | Overhead Rectangular Tile |
| --- | --- | --- | --- | --- |
| Format 0 | 2.5 μs | 3 | 15.65% | 14% |
| Format 1 | 6 μs | 2 | 20.87% | 18.75% |
| Format 2 | 2.5 μs | 4 | 20.87% | 18.75% |
| Format 3 | 6 μs | 4 | 41.75% | 37.5% |
| Format 4 | 9 μs | 2 | 27.82% | 25% |
| Format 5 | 9 μs | 4 | 55.65% | 50% |
| Format 6 | 13 μs | 2 | 41.74% | 50% |

FIGS. 6A through 6G show seven example pilot patterns that may be used for the odd and even tiles shown in FIGS. 5A and 5B. Other pilot patterns may also be defined for these odd and even tiles. Other tiles may also be defined for the time frequency resources available for OFDM, and appropriate pilot patterns may be defined for these other tiles.

The system may support a set of pilot patterns designed for different channel conditions and spatial ranks. A suitable pilot pattern may be selected for a terminal based on the channel conditions and spatial rank applicable for the terminal. A new pilot pattern may be selected for the terminal whenever the channel conditions and/or the spatial rank change sufficiently to merit a change in pilot pattern. The pilot pattern may be selected by any entity (the access point or the terminal) that have access to information pertinent for making the selection.

The tiles and pilot patterns described herein may be used for transmission on the forward link as well as the reverse link. On the reverse link, a terminal may transmit a dedicated pilot to an access point on pilot tones in a tile assigned to that terminal. On the forward link, an access point may transmit a dedicated pilot to a terminal on pilot tones in a tile assigned to that terminal.

An access point may also transmit a common pilot that may be used by all terminals within the coverage of the access point. For example, the access point may transmit a common pilot on every P-th subcarriers in each OFDM symbol period, where P may be equal to 4, 8, or some other suitable value. If multiple antennas are present, then the access point may cycle through the antennas across frequency and/or time. As an example for two antennas, the access point may transmit the common pilot from a first antenna on every 16-th subcarrier and transmit the common pilot from a second antenna on every 16-th subcarrier, with the subcarriers used for the second antenna being interlaced with the subcarriers used for the first antenna.

The system may support frequency hopping for the OFDMA channel to allow a data transmission to better withstand deleterious path effects such as frequency selective fading, narrow-band interference, jamming, etc. With frequency hopping, different tiles in different parts of the OFDM spectrum may be assigned to a terminal in different scheduling intervals, e.g., different half-slots.

Figure 7:
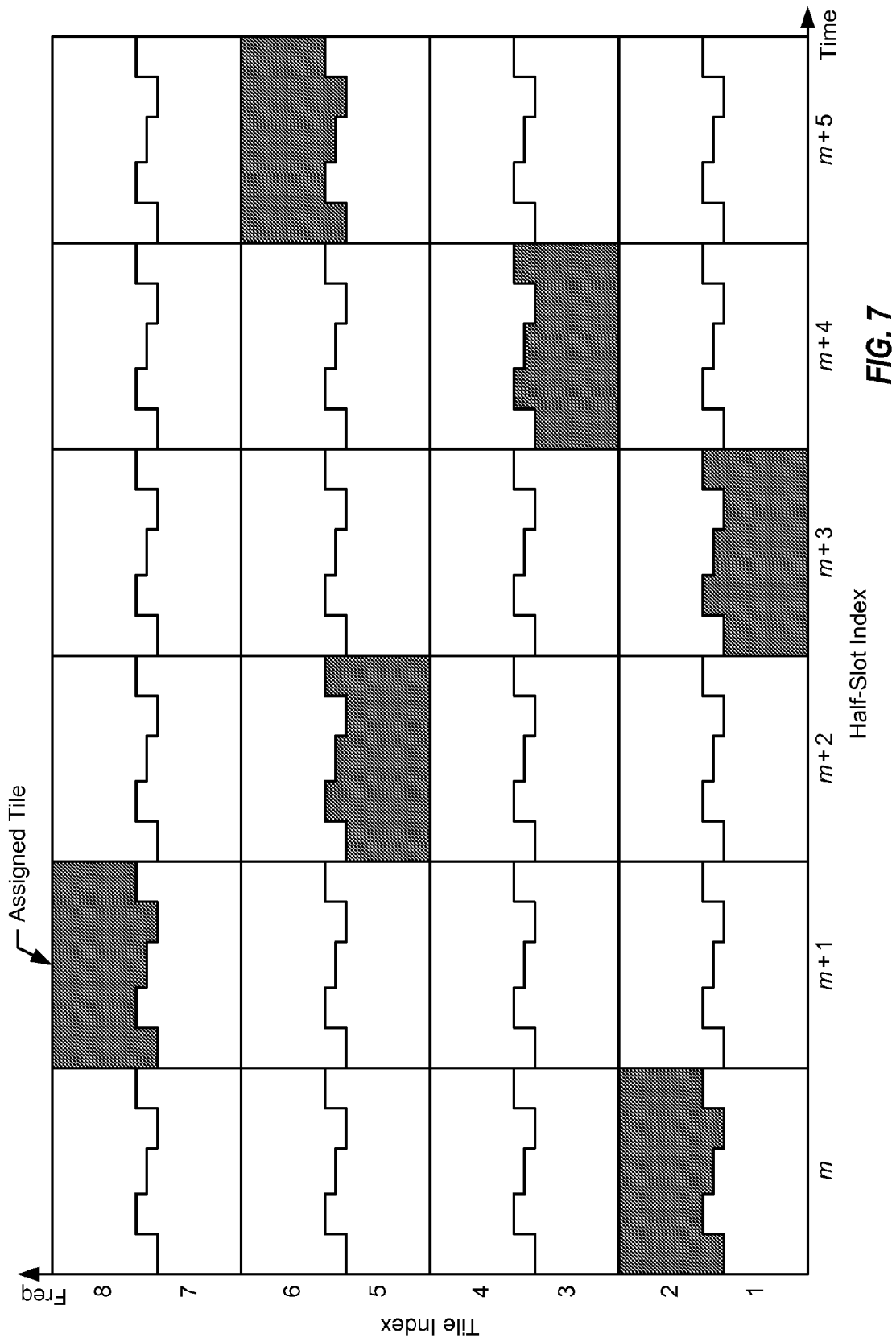
FIG. 7 illustrates frequency hopping for one HRPD carrier.

FIG. 7 illustrates frequency hopping on a time frequency plane for one HRPD carrier with the tiles shown in FIGS. 5A and 5B. In this example, eight tiles with indices of 1 through 8 may be defined for each half-slot and assigned to different terminals. A terminal may be assigned a specific sequence of tiles over time. Different tiles may be selected in a pseudo-random or deterministic manner in different half-slots to achieve frequency diversity. The sequence of tiles assigned to a terminal in one cell may also be pseudo-random with respect to the sequences of tiles assigned to terminals in neighbor cells in order to randomize inter-cell interference.

Figures 8, 9:
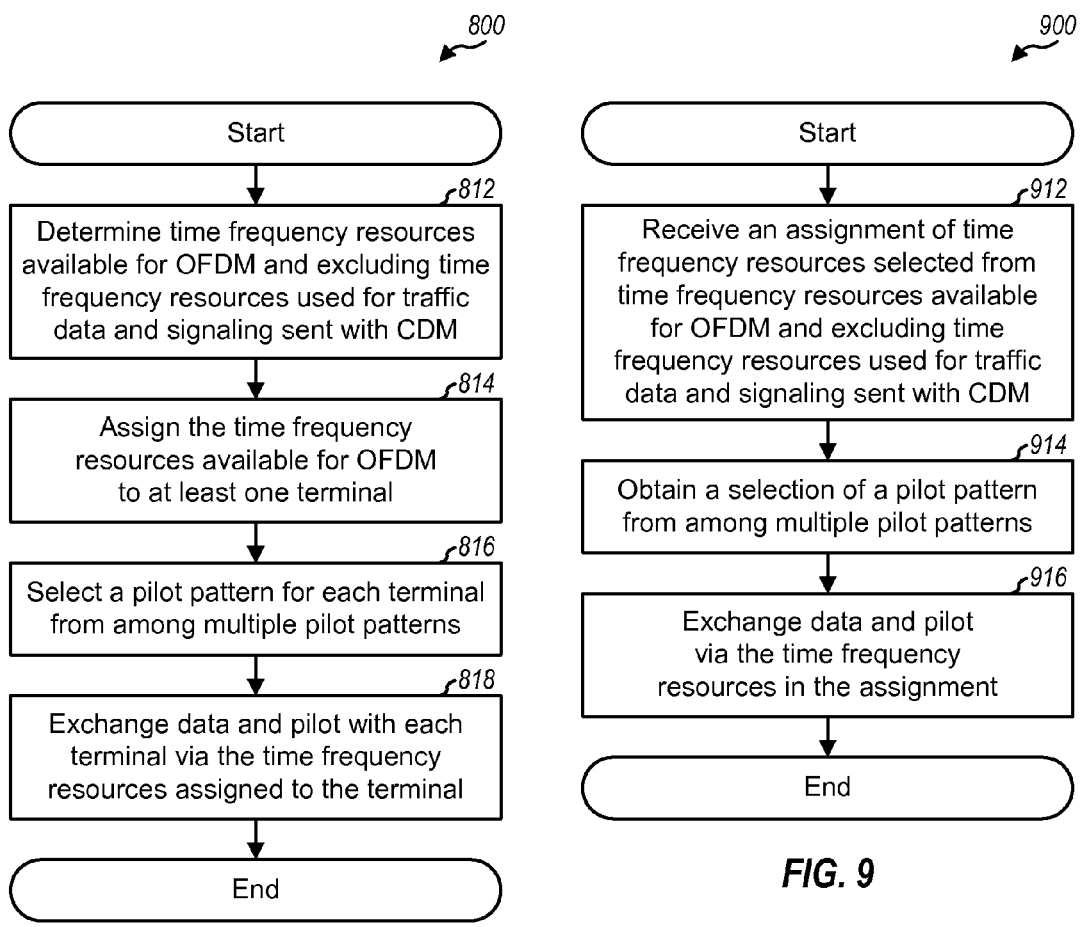
FIG. 8 shows a process performed by an access point for communication.
FIG. 9 shows a process performed by a terminal for communication.

FIG. 8 shows a design of a process 800 performed by an access point for communication. Time frequency resources available for OFDM and excluding time frequency resources used for traffic data and signaling sent with CDM may be determined (block 812). The time frequency resources available for OFDM may be assigned to at least one terminal (block 814). For block 814, the time frequency resources available for OFDM may be partitioned into multiple tiles. Each tile may correspond to a block of time frequency resources and may have a non-rectangular shape, e.g., due to use of multiple OFDM symbol numerologies. Each tile may include a first section of time frequency resources defined based on a first OFDM symbol numerology (e.g., the left traffic interval in FIG. 5A), a second section of time frequency resources defined based on a second OFDM symbol numerology (e.g., the overhead interval in FIG. 5A), and a third section of time frequency resources defined based on the first OFDM symbol numerology (e.g., the right traffic interval in FIG. 5A). At least one of the multiple tiles may be assigned to each terminal. Each terminal may also be assigned different ones of the multiple tiles over time with frequency hopping to achieve frequency diversity and interference randomization.

A pilot pattern may be selected for each terminal from among multiple pilot patterns (block 816). Alternatively, each terminal may select a suitable pilot pattern and convey the selected pilot pattern to the access point. The multiple pilot patterns may support different delay spreads, and a pilot pattern may be selected for each terminal based on an expected delay spread for that terminal. The multiple pilot patterns may also support different spatial ranks, and a pilot pattern may be selected for each terminal based on the spatial rank for that terminal. Each pilot pattern may include multiple clusters of pilot tones placed across a tile, with each pilot tone corresponding to one subcarrier in one symbol period used for pilot. The multiple clusters of pilot tones for each pilot pattern may be placed in different frequency locations and/or different time locations across the tile, e.g., as shown in FIGS. 6A through 6G.

Data and pilot may be exchanged with each terminal via the time frequency resources in the at least one tile assigned to that terminal (block 816). For the forward link, data may be sent to each terminal on the at least one tile assigned to that terminal, and pilot may also be sent on the at least one tile and based on the pilot pattern selected for the terminal. For the reverse link, data may be received from each terminal on the at least one tile assigned to that terminal, and pilot may also be received on the at least one tile and based on the pilot pattern selected for the terminal. OFDM symbols may be processed (e.g., for OFDM modulation or demodulation) based on multiple OFDM symbol numerologies for each assigned tile. A common pilot may also be sent across the time frequency resources available for OFDM.

FIG. 9 shows a design of a process 900 performed by a terminal for communication. The terminal may receive an assignment of time frequency resources selected from time frequency resources available for OFDM and excluding time frequency resources used for traffic data and signaling sent with CDM (block 912). The assignment may be for a tile corresponding a block of time frequency resources, which may have a non-rectangular shape. The assignment may also be for different tiles over time to achieve frequency hopping. The terminal may obtain a selection of a pilot pattern from among multiple pilot patterns (block 914). The pilot pattern may be selected by the terminal and conveyed to an access point, or selected by the access point and conveyed to the terminal. Data and pilot may be exchanged (e.g., sent and/or received) via the time frequency resources in the assignment (block 916). OFDM symbols may be processed based on multiple OFDM symbol numerologies to exchange data via the assigned time frequency resources. Pilot symbols may also be processed based on the selected pilot pattern.

The non-rectangular tiles, pilot patterns for these tiles, and hopping of tiles in the time-frequency plane for fading/interference diversity are some examples of how different design elements of classical OFDMA systems (with homogeneous OFDM symbol numerology and rectangular tile structures) may be incorporated in a hybrid system where OFDM components with heterogeneous symbol numerologies may be embedded in a seamless, backward compatible manner on an existing signal waveform (such as the HRPD forward link waveform).

Figure 10:
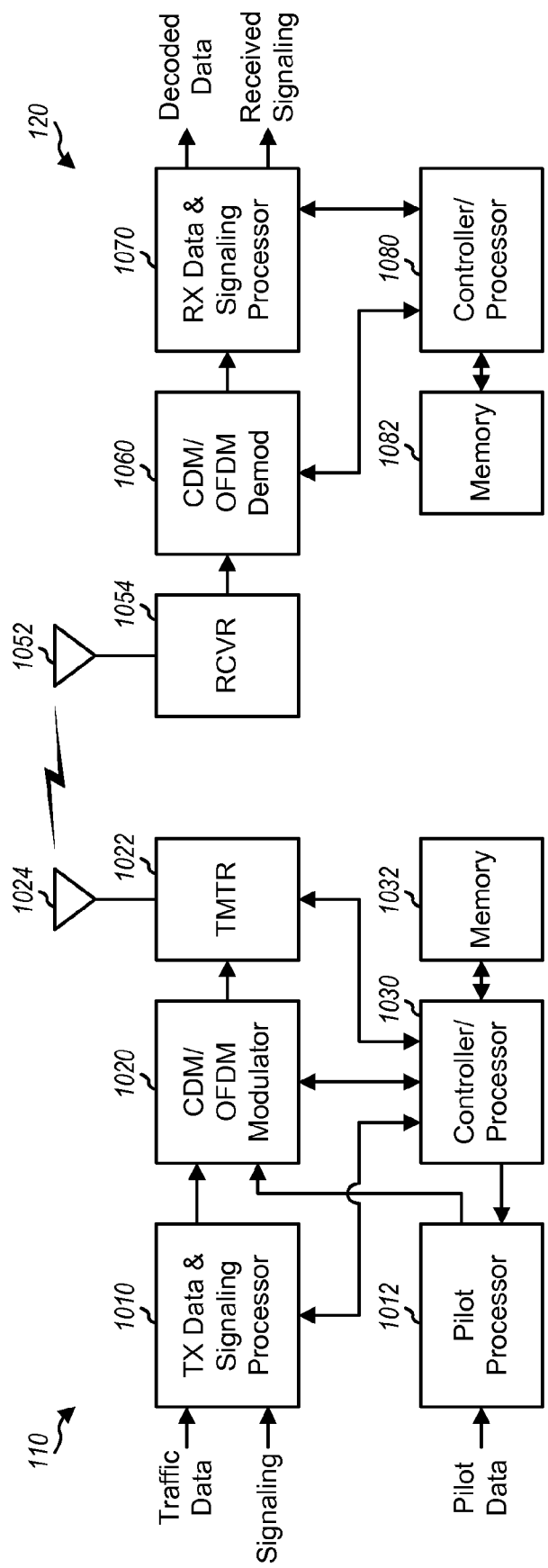
FIG. 10 shows a block diagram of an access point and a terminal.

FIG. 10 shows a block diagram of a design of an access point 110 and a terminal 120, which are one of the access points and terminals in FIG. 1. For simplicity, only processing units for transmission on the forward link are shown in FIG. 10. Also for simplicity, access point 110 and terminal 120 are each shown with one antenna. In general, each entity may be equipped with any number of antennas.

At access point 110, a transmit (TX) data and signaling processor 1010 receives and processes (e.g., encodes, interleaves, and symbol maps) traffic data and signaling and provides data symbols and signaling symbols, respectively. A data symbol is a symbol for traffic data, a signaling symbol is a symbol for signaling, a pilot symbol is a symbol for pilot, and a symbol is typically a complex value. A pilot processor 1012 generates pilot symbols for each terminal based on a pilot pattern selected for that terminal. A CDM/OFDM modulator 1020 receives the data symbols and signaling symbols from processor 1010 and the pilot symbols from processor 1012, performs CDM and/or OFDM modulation on the received symbols, and provides output samples. Modulator 1020 may perform CDM processing for symbols sent in traffic and overhead segments using CDM. Modulator 1020 may perform OFDM processing for symbols sent in time frequency resources used for OFDM. A transmitter (TMTR) 1022 processes (e.g., converts to analog, amplifies, filters, and frequency upconverts) the output samples from modulator 1020 and generates a forward link signal, which is transmitted via an antenna 1024.

At terminal 120, an antenna 1052 receives the forward link signal from access point 110 and provides a received signal to a receiver (RCVR) 1054. Receiver 1054 processes (e.g., filters, amplifies, frequency downconverts, and digitizes) the received signal and provides received samples. A CDM/OFDM demodulator (Demod) 1060 processes the received samples in a manner complementary to the processing by CDM/OFDM modulator 1020. Demodulator 1060 may derive a channel estimate for the wireless channel between access point 110 and terminal 120 based on received pilot symbols. Demodulator 1060 may process the received samples for CDM and/or OFDM to obtain received symbols and may then perform data detection on the received symbols with the channel estimate to obtain symbol estimates, which are estimates of the data symbols and signaling symbols sent by access point 110 to terminal 120. A receive (RX) data and signaling processor 1070 processes (e.g., symbol demaps, deinterleaves, and decodes) the symbol estimates and provides decoded data and signaling. In general, the processing by CDM/OFDM demodulator 1060 and RX data and signaling processor 1070 is complementary to the processing by CDM/OFDM modulator 1020 and TX data and signaling processor 1010, respectively, at access point 110.

Controllers 1030 and 1080 direct the operation at access point 110 and terminal 120, respectively. Memories 1032 and 1082 store program codes and data for access point 110 and terminal 120, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for wireless transmission in HRPD communication that supports spatial techniques, determines time frequency resources available for OFDM and excludes time frequency resources used for traffic data and signaling sent with CDM, comprising:
   a) at least one processor to: determine time frequency resources available for orthogonal frequency division multiplexing (OFDM) and excluding time frequency resources used for traffic data and signaling sent with code division multiplexing (CDM) using a slot structure that is backward compatible with existing terminals; assign the time frequency resources available for OFDM to at least one terminal and exchanges data with each terminal via the time frequency resources assigned to that terminal; partitions the time frequency resources available for OFDM into multiple tiles, each tile corresponding to a block of tile frequency resources;
   assign at least one of the multiple tiles to at least one terminal;
   process OFDM symbols based on multiple OFDM symbol numerologies used in a traffic interval in HRPD to embed OFDM data in an HRPD waveform for each tile assigned to the at least one terminal; and
   b) a memory coupled to the at least one processor.

2. The apparatus of claim 1, wherein each tile corresponds to a block of time frequency resources having a non-rectangular shape.

3. The apparatus of claim 1, wherein the at least one processor partitions the time frequency resources available for OFDM into multiple tiles of at least two different non-rectangular shapes.

4. The apparatus of claim 3, wherein two of the different non-rectangular shapes have mirror symmetry.

5. The apparatus of claim 4, wherein the two different non-rectangular shapes with mirror symmetry are associated with pilot patterns with mirror symmetry.

6. The apparatus of claim 1, wherein the at least one processor processes OFDM symbols based on multiple OFDM symbol numerologies for each tile assigned to the at least one terminal.

7. The apparatus of claim 1, wherein each tile includes a first section of time frequency resources defined based on a first OFDM symbol numerology and a second section of time frequency resources defined based on a second OFDM symbol numerology.

8. The apparatus of claim 7, wherein each tile further includes a third section of time frequency resources defined based on the first OFDM symbol numerology, the second section being located between the first and third sections.

9. The apparatus of claim 1, wherein the at least one processor assigns each terminal different ones of the multiple tiles over time to achieve frequency hopping.

10. The apparatus of claim 1, wherein the at least one processor selects a pilot pattern for each terminal from among multiple pilot patterns.

11. The apparatus of claim 10, wherein the multiple pilot patterns support at least two different delay spreads, and wherein the at least one processor selects the pilot pattern for each terminal based on an expected delay spread for the terminal.

12. The apparatus of claim 10, wherein the multiple pilot patterns support at least two different spatial ranks, and wherein the at least one processor selects the pilot pattern for each terminal based on a spatial rank for the terminal.

13. The apparatus of claim 10, wherein each of the multiple pilot patterns includes multiple clusters of pilot tones placed across a tile corresponding to a block of time frequency resources, each pilot tone corresponding to one subcarrier in one symbol period used for pilot.

14. The apparatus of claim 13, wherein the multiple clusters of pilot tones for each pilot pattern are placed in at least two frequency locations across the tile.

15. The apparatus of claim 13, wherein the multiple clusters of pilot tones for each pilot pattern are placed in at least two time locations across the tile.

16. The apparatus of claim 1, wherein the at least one processor sends a common pilot across the time frequency resources available for OFDM.

17. The apparatus of claim 1, wherein the at least one processor sends data to each terminal on the at least one tile assigned to the terminal and sends pilot to each terminal on the at least one tile and based on a pilot pattern selected for the terminal.

18. The apparatus of claim 1, wherein the at least one processor receives data from each terminal on the at least one tile assigned to the terminal and receives pilot from each terminal on the at least one tile and based on a pilot pattern selected for the terminal.

19. A wireless transmission method in HRPD communication that supports spatial techniques, determines time frequency resources available for OFDM and excludes time frequency resources used for traffic data and signaling sent with CDM comprising:
   determining time frequency resources available for orthogonal frequency division multiplexing (OFDM) and excluding time frequency resources used for traffic data and signaling sent with code division multiplexing (CDM)using a slot structure that is backward compatible with existing terminals; and
   assigning the time frequency resources available for OFDM to at least one terminal.

20. The method of claim 19, wherein the assigning the time frequency resources available for OFDM comprises
   partitioning the time frequency resources available for OFDM into multiple tiles, each tile corresponding to a block of time frequency resources, and
   assigning at least one of the multiple tiles to each of the at least one terminal.

21. The method of claim 20, further comprising:
   processing OFDM symbols based on multiple OFDM symbol numerologies for each tile assigned to the at least one terminal.

22. The method of claim 19, further comprising:
   selecting a pilot pattern for each terminal from among multiple pilot patterns.

23. An apparatus for wireless transmission in HRPD communication that supports spatial techniques, determines time frequency resources available for OFDM and excludes time frequency resources used for traffic data and signaling sent with CDM comprising:
- means for determining time frequency resources available for orthogonal frequency division multiplexing (OFDM) and excluding time frequency resources used for traffic data and signaling sent with code division multiplexing (CDM) using a slot structure that is backward compatible with existing terminals; and
- means for assigning the time frequency resources available for OFDM to at least one terminal.

24. The apparatus of claim 23, wherein the means for assigning the time frequency resources available for OFDM comprises
- means for partitioning the time frequency resources available for OFDM into multiple tiles, each tile corresponding to a block of time frequency resources, and
- means for assigning at least one of the multiple tiles to each of the at least one terminal.

25. The apparatus of claim 24, further comprising:
- means for processing OFDM symbols based on multiple OFDM symbol numerologies for each tile assigned to the at least one terminal.

26. The apparatus of claim 23, further comprising:
- means for selecting a pilot pattern for each terminal from among multiple pilot patterns.

27. A processor readable, non-transitory, tangible, storage media for storing instructions, to cause a processor to perform the following steps:
- determine time frequency resources available for orthogonal frequency division multiplexing (OFDM) and excluding time frequency resources used for traffic data and signaling sent with code division multiplexing (CDM) using a slot structure that retains backward compatibility for existing terminals; and
- assign the time frequency resources available for OFDM to at least one terminal.

28. The processor readable media of claim 27, and further for storing instructions to:
- select a pattern for each terminal from among multiple pilot patterns.

29. An apparatus for wireless transmission in HRPD communication that supports spatial techniques, determines time frequency resources available for OFDM and excludes time frequency resources used for traffic data and signaling sent with CDM comprising:
- assign the time frequency resources available for OFDM to at least one terminal and exchanges data with each terminal via the time frequency resources assigned to that terminal; at least one processor to receive the assignment of time frequency resources selected from time frequency resources available for orthogonal frequency division multiplexing (OFDM) and excluding time frequency resources used for traffic data and signaling sent with code division multiplexing (CDM) using a slot structure that is backward compatible with existing terminals, and to exchange data via the time frequency resources in the assignment; and a memory coupled to the at least one processor.

30. The apparatus of claim 29, wherein the assignment is for a block of time frequency resources having a non-rectangular shape.

31. The apparatus of claim 29, the at least one processor processes OFDM symbols based on multiple OFDM symbol numerologies to exchange data via the time frequency resources in the assignment.

32. The apparatus of claim 29, wherein the at least one processor processes pilot symbols based on a pilot pattern selected from among multiple pilot patterns.

33. The apparatus of claim 32, wherein the pilot pattern includes multiple clusters of pilot tones placed across a tile corresponding to the time frequency resources in the assignment, and wherein the at least one processor sends at least one pilot symbol from at least one antenna on at least one pilot tone in each of the multiple clusters, one pilot symbol from each antenna in each cluster.

34. The apparatus of claim 32, wherein the pilot pattern includes multiple clusters of pilot tones placed across a tile corresponding to the time frequency resources in the assignment, and wherein the at least one processor sends at least one pilot symbol for at least one data stream in each of the multiple clusters, each pilot symbol being spread across all pilot tones in a cluster with an orthogonal code.

35. A wireless transmission method comprising: assigning the time frequency resources available for OFDM to at least one terminal and exchanges data with each terminal via the time frequency resources assigned to that terminal; receiving the assignment of time frequency resources selected from time frequency resources available for orthogonal frequency division multiplexing (OFDM) and excluding time frequency resources used for traffic data and signaling sent with code division multiplexing (CDM) that utilizes a slot structure that retains backward compatibility with existing terminals; and exchanging data via the time frequency resources in the assignment.

36. The method of claim 35, wherein the exchanging data comprises processing OFDM symbols based on multiple OFDM symbol numerologies to exchange data via the time frequency resources in the assignment.

37. The method of claim 35, further comprising:
- processing pilot symbols based on a pilot pattern selected from among multiple pilot patterns.

38. An apparatus for wireless transmission in HRPD communication that supports spatial techniques, determines time frequency resources available for OFDM and excludes time frequency resources used for traffic data and signaling sent with CDM comprising: means for assigning the time frequency resources available for OFDM to at least one terminal and exchanges data with each terminal via the time frequency resources assigned to that terminal; means for receiving the assignment of time frequency resources selected among time frequency resources available for orthogonal frequency division multiplexing (OFDM) and excluding time frequency resources used for traffic data and signaling sent with code division multiplexing (CDM) that uses a slot structure that retains backward compatibility with existing terminals; and means for exchanging data via the time frequency resources in the assignment.

39. The apparatus of claim 38, wherein the means for exchanging data comprises
- means for processing OFDM symbols based on multiple OFDM symbol numerologies to exchange data via the time frequency resources in the assignment.

40. The apparatus of claim 38, further comprising:
- means for processing pilot symbols based on a pilot pattern selected from among multiple pilot patterns.

* * * * *